United States Patent
Stewart et al.

(10) Patent No.: US 10,569,515 B2
(45) Date of Patent: Feb. 25, 2020

(54) ULTRA-HIGH BARRIER METALLIZED FILM

(71) Applicant: Taghleef Industries Inc., Newark, DE (US)

(72) Inventors: Adam Stewart, Wodonga (AU);
Andrew Wilkie, Avondale, PA (US);
Christiane Tardy, Boucherville (CA);
Roger Beardwell, Albury (AU)

(73) Assignee: TAGHLEEF INDUSTRIES INC., Newark, DE (US)

( * ) Notice: Subject to any disclaimer, the term of this patent is extended or adjusted under 35 U.S.C. 154(b) by 334 days.

(21) Appl. No.: 15/522,049

(22) PCT Filed: Oct. 27, 2014

(86) PCT No.: PCT/US2014/062362
§ 371 (c)(1),
(2) Date: Apr. 26, 2017

(87) PCT Pub. No.: WO2016/068836
PCT Pub. Date: May 6, 2016

(65) Prior Publication Data
US 2017/0326855 A1 Nov. 16, 2017

(51) Int. Cl.
*B32B 27/32* (2006.01)
*B32B 27/08* (2006.01)
*B32B 27/34* (2006.01)

(52) U.S. Cl.
CPC .............. *B32B 27/32* (2013.01); *B32B 27/08* (2013.01); *B32B 27/34* (2013.01); *B32B 2250/242* (2013.01); *B32B 2255/10* (2013.01); *B32B 2255/205* (2013.01); *B32B 2255/26* (2013.01); *B32B 2255/28* (2013.01); *B32B 2307/518* (2013.01); *B32B 2307/7244* (2013.01); *B32B 2307/7265* (2013.01); *B32B 2307/734* (2013.01); *B32B 2307/75* (2013.01)

(58) Field of Classification Search
CPC ......... B32B 27/32; B32B 27/08; B32B 27/34; B32B 2250/242; B32B 2255/10; B32B 2255/205; B32B 2255/26; B32B 2255/28; B32B 2307/518; B32B 2307/7244; B32B 2307/7265; B32B 2307/734; B32B 2307/75
See application file for complete search history.

(56) References Cited

U.S. PATENT DOCUMENTS

| | | | |
|---|---|---|---|
| 4,343,852 | A | 8/1982 | Isaka et al. |
| 4,487,871 | A | 12/1984 | Ishibashi et al. |
| 4,888,237 | A | 12/1989 | Balloni et al. |
| 4,975,315 | A | 12/1990 | Bothe et al. |
| 5,277,970 | A | 1/1994 | Schuhmann et al. |
| 5,281,483 | A | 1/1994 | Hwo |
| 5,302,427 | A | 4/1994 | Murschall et al. |
| 5,326,625 | A | 7/1994 | Schuhmann et al. |
| 5,366,796 | A | 11/1994 | Murschall et al. |
| 5,436,041 | A | 7/1995 | Murschall et al. |
| 5,478,643 | A | 12/1995 | Peiffer et al. |
| 5,489,454 | A | 2/1996 | Peiffer et al. |
| 5,492,757 | A | 2/1996 | Schuhmann et al. |
| 6,033,786 | A | 3/2000 | Fatica et al. |
| 6,844,078 | B2 | 1/2005 | Su et al. |
| 2003/0148119 | A1 | 8/2003 | Su et al. |
| 2008/0070050 | A1 | 3/2008 | Urbain et al. |
| 2008/0318036 | A1 | 12/2008 | Nassi et al. |

OTHER PUBLICATIONS

International Search Report from corresponding PCT/US2014/062362 dated Jul. 9, 2015.

*Primary Examiner* — Michael C Miggins
(74) *Attorney, Agent, or Firm* — Caesar Rivise, PC

(57) ABSTRACT

A metallized multi-layer film having ultra-high oxygen and moisture barrier properties includes a core layer and a metal bonding layer preferably formed by coextruding. The metal bonding layer includes a preponderance, by weight, of a propylene/butene-1 copolymer free of particulates. A metal coating adhered to the metal bonding layer having a metal adhesion strength to the metal coating in excess of 90%, and the metallized film includes an oxygen barrier of less than 15.0 cc/m2/day and a water barrier of less than 0.1 gms/m2/day.

10 Claims, No Drawings

ULTRA-HIGH BARRIER METALLIZED FILM

FIELD OF INVENTION

This invention relates generally to an ultra-high barrier metallized film and more specifically to a multi-layer, metallized film having ultra-high oxygen barrier and moisture barrier properties.

BACKGROUND ART

Multi-layer, metallized films having high oxygen barrier and moisture barrier properties are known in the art, and are highly desirable for use in packaging food products. Metallized films are particularly well suited for providing such high oxygen barrier and moisture barrier properties. Exemplary multi-layer metallized films having moisture barrier and oxygen barrier properties are disclosed in the following United States patents: U.S. Pat. No. 6,033,786 (Fatica, et al.), U.S. Pat. No. 6,844,078 (Su, et al.), U.S. Pat. No. 4,343,852 (Isaka, et al.), U.S. Pat. No. 4,888,237 (Balloni, et al.), U.S. Pat. No. 5,366,796 (Murscall, et al.), U.S. Pat. No. 5,436,041 (Murscall, et al.), U.S. Pat. No. 4,487,871 (Ishibashi, et al.), U.S. Pat. No. 5,492,757 (Schuhmann, et al.), U.S. Pat. No. 4,975,315 (Boothe, et al.), U.S. Pat. No. 5,478,643 (Peiffer, et al.), U.S. Pat. No. 5,489,454 (Peiffer, et al.), U.S. Pat. No. 5,302,427 (Murschall, et al.), U.S. Pat. No. 4,343,852 (Isaka, et al.), U.S. Pat. No. 5,326,625 (Schuhmann, et al.), U.S. Pat. No. 5,277,970 (Schuhmann, et al.) and U.S. Pat. No. 5,281,483 (Hwo). The full disclosures of all of the above identified patents are fully incorporated by reference herein.

Although a number of these prior art multi-layer metallized films have oxygen and moisture barrier properties suitable for a variety of applications, a need still exists for multi-layer films having ultra-high barrier properties with excellent metal adhesion. None of the above-identified prior art patents disclose films having the ultra high barrier properties achieved by the present invention.

SUMMARY OF THE INVENTION

A metallized multi-layer film having ultra-high oxygen and moisture barrier properties, an optical density greater than 2.4; more preferably greater than 2.6 and most preferably at least 2.8, and a metal adhesion in excess of 90%. Preferably the film includes a core layer, a metal bonding layer including a preponderance, by weight, of a propylene/butene-1 copolymer being free of particulates, such as reclaim materials and antiblock agents, and a metal coating. The metal bonding layer has one surface adhered to a first surface of the core layer and an opposed surface to which the metal coating is applied. The metal coating adhered to the opposed surface of the metal bonding layer has a metal adhesion in excess of 90%, and the film has an oxygen barrier of less than 15 cc/m2/day and a water barrier of less than 0.1 gms/m2/day; more preferably an oxygen barrier in the range of 5.43-9.3 cc/m2/day, and most preferably in the range of 6.2-7.75 cc/m2/day. The water barrier more preferably is less than 0.0775 gms/m2/day and even more preferably in the range of 0.047 to 0.0775 gms/m2/day In a preferred form of the invention the metal bonding layer includes at least 60% by weight of a propylene/butene-1 copolymer and most preferably 100% by weight of such copolymer.

In the preferred embodiment of this invention, the metal bonding layer is a thin layer having a thickness of less than 1 micron, and more preferably a thickness of about 0.50 microns or less. As noted earlier, the bonding layer preferably is free of particulates, e.g., antiblock additives and reclaim material. However, the inclusion of a minor amount of an antiblock agent or other particulate that does not adversely affect either the oxygen or water barrier properties; but simply is included in the bonding layer in an effort to circumvent the coverage in the claims, is within the scope of the limitation that the bonding layer is free of antiblock additives or other particulates.

In the most preferred embodiment of this invention, the film includes an additional layer adhered to a second surface of the core layer opposite the first surface to which the metal bonding layer is attached. The additional layer preferably is a sealant layer, and most preferably includes an ethylene/propylene/butene-1 terpolymer and also an antiblock and slip agent that does not migrate into the other layers to adversely affect the properties of such other layers.

Applicants discovered, quite surprisingly, that when a sealant layer is included in the film heavy loadings of an antiblock agent and slip agent are required in order to obtain the ultra high barrier oxygen and moisture barrier properties of this invention. Specifically, applicants have determined that the sealant layer should include about 6-10%, by weight, of a spherical 4 micron cross-linked polymethylmethacrylate masterbatch including approximately 5% (3,600-6,000 ppm) of a spherical 4 micron cross-linked polymethylmethacrylate therein (slip agent), and 6-20% by weight of a synthetic silica master batch including approximately 2% (1,200-4,000 ppm) of a non-spherical 4.5 micron synthetic silica therein (antiblock agent). These high loadings are believed to prevent metal picking of the metal layer on the opposed surface when a roll of the film is being unwound. Metal picking adversely affects the barrier properties of the film; preventing the film from possessing the ultra high barrier properties required in this invention.

It is extremely important that the antiblock and slip agents in the additional layer be non-migratory, and that a very high optical density above 2.4, and preferably above 2.6 be included in the film of this invention to achieve the required ultra high oxygen and moisture barrier properties of this invention. In fact, the target optical density is greater than 2.6 and most preferably 2.8 or greater. None of the prior art known to applicants disclose the importance of these latter two attributes in achieving the ultra high barrier properties that are achieved in the present invention.

It is important in this invention, that the metal bonding layer, prior to adhering the metal coating thereto, is oxidatively treated to enhance the adherence of the metal coating to the metal bonding layer. Any of the conventional types of oxidative treatment are believed to be useable in this invention, such as corona treatment, flame treatment or a combination of corona treatment and plasma treatment. The oxidative treatment can be carried out in line; however, when the combination of corona treatment and plasma treatment is employed the corona treatment preferably is carried out in line with the initial manufacture of the film, prior to metallization. Thereafter, the corona treated film is unwound and subject to plasma treatment in-line with the metal coating operation.

Most preferably when a combination of corona treatment and plasma treatment is employed as the oxidation treatment the corona treatment is carried out at approximately 90 to 110 watts/meter/minute to provide a dyne level in the range of 38-50 dynes. The plasma treatment is carried out at a power of approximately 7 amps in a gas mixture comprising 400 standard cubic centimeters per minute (sccm) Oxygen (99.9% purity) and 600 sccm Argon (99.997% purity). The dyne level post plasma treatment is expected to be typically over 50 dynes.

When corona treatment is employed alone as the oxidative treatment step it is carried out at approximately 130 to 150 watts/meter/minute to provide a dyne level in the range of greater than 42 dynes-50 dynes.

When flame treatment is employed alone as the oxidative treatment step it is carried out at a dyne level in the range of 43-56 dynes at the optimum stoichiometric ratio.

The dyne level was determined by ASTM D2578 with a minor variation. Specifically, rather than applying the test reagent/solution to the film surface with a cotton applicator (bud), which has been first wetted, a small number of droplets of the reagent were applied to the film surface and then drawn down with a 'K-Bar' to evenly disperse the solution over the film surface.

It should be understood that the metallized multi-layer film of this invention commonly is bonded to a second multi-layer film to thereby provide a multi-component packaging film employed to package a variety of products. The most significant applications for the multi-component films of this invention are in the packaging of food products, e.g., potato chips and other snack items.

In a preferred form of this invention the multi-component structure of this invention is formed by extrusion bonding the multi-layer metallized film of this invention to a second multi-layer film by extruding a polyethylene bonding film layer between the metal coating and a peripheral surface of a second multi-layer film. The second multi-layer film preferably is clear and the surface extrusion bonded by the polyethylene bonding film layer is reverse printed so that the indicia is readable through the opposed peripheral surface of the second multi-layer film. Thus, both the metal coating and the printed indicia are protected against damage, e.g., scratching, by being buried within the interior of the multi-component structure.

In a preferred form of this invention the extruded polyethylene bonding layer has a thickness in the range of 5 microns to 15 microns, and more preferably in the range of 8 microns to 12 microns.

In accordance with this invention the multi-layer, metallized film can be adhesively laminated to the second multilayer film rather than being extrusion laminated. In addition, it should be understood that the invention includes the multi-layer, metallized film by itself (i.e., not bonded or adhered to a second multi-layer film.

The most preferred multi-layer, metallized films of this invention are "heat set" and are not considered to be heat shrinkable films.

DETAILED DESCRIPTION OF THE INVENTION

Reference throughout this application to the multi-layer film or films being "heat set" identifies films which, in the plastic film art, are not considered to be heat shrinkable.

Reference throughout this application to the "metal coating" being part of the metallized films of this invention is limited (1) to a metal coating that is tenaciously adhered to film (i.e., it is not transferable from the film of this invention to another substrate), and (2) to a metal coating that is applied by a deposition process such as sputtering, vacuum, vapor deposition and electroplating, and not as a metal layer formed separately from the multi-layer films of this invention, either alone or laminated to another carrier layer or film.

Reference to "high crystallinity polypropylene" means a polypropylene having intermolecular stereoregularity greater than 93%. Reference to "conventional polypropylene" means polypropylene having an intermolecular stereoregularity no greater than 93%.

More preferably the multi-layer metallized film of this invention is formed by providing a metal coating on a coextruded film including at least two layers: a core layer and a metal bonding layer coextruded with the core layer.

Most preferably the multi-layer coextruded film is at least a three layer structure having a sealant layer on the side of the core layer opposite the metal bonding layer.

In the preferred embodiments of this invention the core layer preferably either is a conventional polypropylene or a high crystalline polypropylene either with or without commonly known hard resins. If desired a hard resin can be included in an amount of up to about 10% by weight of the polymer composition of the core. The inclusion of a hard resin in the core improves the mechanical properties of the film, when utilized in conjunction either with normal polypropylene or high crystalline polypropylene. When used with high crystalline polypropylene the hard resin also improves the drawability or stretch properties of the film.

In accordance with the broadest aspects of this invention the coextruded film can include more than three layers. However, an important feature of this invention is that the metal bonding layer is a thin skin layer having a thickness of less than one micron. Providing a thin copolymer layer gives a smooth surface for metal lay down; thereby enhancing the bond strength of the metal coating to the copolymer layer.

Another important feature of this invention is that the metal bonding layer includes a preponderance, by weight, of a propylene/butene-1 copolymer; more preferably at least 60%, by weight, and most preferably 100%, by weight. A representative propylene/butene-1 copolymer usable in this invention is ADSYL 3C30FHP, manufactured by Lyondellbasell, Italy, having its main office in Milan Italy.

It is highly desirable in this invention that the metal bonding layer is free of antiblock additives, which, if present, can adversely affect the smoothness of the metal bonding layer. This, in turn, can adversely affect the adhesion between the metal coating and the metal bonding layer. However, as noted earlier herein, the inclusion a minor amount and type of a particulate (e.g., reclaim material, antiblock additive, etc.) that does not affect the adhesion between the metal coating and the metal bonding layer is considered to be within the scope of the invention.

In accordance with this invention the core layer preferably is polypropylene having a thickness preferably in the range of 12-25 microns. The core layer can be formed through a single manifold die or multi-manifold die, depending upon the design of the extrusion equipment. A representative polypropylene is HP516J, a conventional polypropylene sold by Lyondellbasell, Geelong, Australia. However, it should be understood that high crystallinity polypropylenes also can be employed in this invention. Exemplary high crystalline polypropylenes are disclosed in Su et al. U.S. Pat. No. 6,844,078, which previously was incorporated by reference herein.

Most preferably the polypropylene that can be employed in the core is free of any reclaim material or other particulates. It is very desirable that the polypropylene polymers employed in the core be virtually free of particulates, since the particulates will enhance the roughness of the bonding layer; thereby impairing the barrier properties in the completed, metallized films of this invention. Most preferably the polypropylene in the core layer is completely free of particulates, such as reclaim material and antiblock agents.

As noted above, in the preferred embodiment of this invention the coextruded film includes a sealant layer opposed to the metal bonding layer, and this addition sealant layer preferably includes an ethylene/propylene/butene-1 terpolymer, preferably including an anti-block agent and a slip agent. A representative terpolymer useable in this invention is Ineos KS357, manufactured by Ineos Olefins and Polymers Europe, located in Brussels, Belgium.

A representative slip agent used in the additional sealant layer is Schulman ABVT 22SC, a masterbatch including 5% spherical 4 micron crosslinked polymethylmethacrylate in a C2C3 copolymer, manufactured by A Schulman, located in East Java, Indonesia.

A representative antiblock used in the additional sealant layer is Lehmann and Voss 33 Konz, a masterbatch including 2% non-spherical 4.5 micron synthetic silica in a C3C2C4 terpolymer, manufactured by Lehmann and Voss KG, located in Hamburg, Germany.

In the most preferred embodiment of this invention the sealant layer includes 6-10% (3,600-6,000 ppm), and more preferably about 8%, by weight, (about 4,800 ppm) of the above-identified polymethylmethacrylate master batch, and 6-20% (1,200-4,000 ppm), and more preferably about 15%, by weight, (about 3,000 ppm) of the above-identified synthetic silica masterbatch. The balance, by weight, of the sealant layer is the above-identified terpolymer. In the most preferred embodiment in which the polymethylmethacrylate master batch is 8% of the weight of the sealant layer and the synthetic silica masterbatch is 15% of the masterbatch the terpolymer is 77%, by weight of the sealant layer.

Applicants' have discovered that in order to obtain the ultra high barrier properties achieved in a three layer structure of this invention employing a sealant layer, a heavy loading of a slip agent and antiblock agent are required. To applicants' knowledge such a heavy loading of a slip and antiblock agent has not been recognized in the prior art as being necessary for achieving the ultra high barrier properties achieved in this invention. While the mechanism for achieving the ultra high barrier properties is not completely understood it is believed that without the high loading of the slip and antiblock additives the sealant layer will cause picking of the metal layer when the film is being unwound; thereby impairing the barrier properties of the film.

It is important in this invention that agents added to any of the layers, such as the antiblock and slip additives employed in the additional sealant layer opposed to the metal bonding layer, are not migratory agents that can migrate into other layers and adversely affect the properties of those other layers. The representative slip and antiblock additives for use in this invention, as identified early, are non-migratory additives, which, as noted earlier, is very important in this invention.

The coextruded multi-layer films of this invention preferably are biaxially oriented films formed in any desired or convention extrusion equipment, such as a tenter machine. As is well known in the art, the coextruded films formed in a tenter machine first are oriented in the machine direction and then in the transverse direction. After transverse-direction orientation the film is heat set to stabilize the structure against undesired shrinkage.

After the biaxially oriented film is formed (including corona treated as specified earlier) it generally is wound into a roll for subsequent off-line metallization to thereby form the metallized film of this invention.

In accordance with one embodiment of this invention the metal bonding layer is corona treated to provide a dyne level in the range of 42 dynes-50 dynes prior to applying the metal coating thereon.

In the preferred embodiment of this invention the oxygen barrier of the metallized film is less than 15 cc/m2/day and the water barrier is less than or equal to 0.1 gms/m2/day. More preferably the oxygen barrier is less than 9.3 cc/m2/day and even more preferably is in the range of 6.2 to 7.75 cc/m2/day. The water barrier more preferably is less than 0.0775 gms/m2/day and even more preferably in the range of 0.047 to 0.0775 gms/m2/day.

The ultra-high barrier properties are achieved in this invention in a film structure wherein the optical density of the metallized coating is greater than 2.4, more preferably greater than 2.6 and most preferably at least 2.8. The metal adhesion strength (i.e. the strength of the metal bond between the metal coating and the metal bond layer) is at least 90%. A high optical density of the above-stated values is important in achieving the high barrier properties of this invention. The most consistent ultra high barrier properties are achieved in this invention when the optical density is at least 2.8.

The oxygen barrier reported herein identifies oxygen permeability and was determined in accordance ASTM D3985 (23C-0% RH).

The moisture barrier reported herein identifies water vapor permeability (WVTR) and was determined by ASTM F1249 (38C-90% RH).

The optical density reported herein is determined as follows:
1. Obtain a transverse direction sample strip having a length equal to the full width of the metallised roll and a width of at least 300 mm wide.
2. Take three square shaped sub samples of minimum size 100 mm×100 mm, from the full width sample, Two, are taken from 200 mm from each edge, and one from the center.
3. Place these sub-samples on the testing table with the metallised side facing up.

They must be clean and free from finger marks, damage from sampling, and loose material in the test area.
4. Using a marker pen, two parallel lines are marked in the center of each sub-sample, in the MD direction, approximately 50 mm apart.
5. Zero the Densitometer (example: Tobias TBX Densitometer) by pressing the Sensing Arm down so that it comes in contact with the Light Table and depressing the button on the back of the Sensing Arm. 0.00 should be displayed.
6. Measure the optical density of the film at three positions in the area between the two marked lines for all three sub-samples. Record all results and note the lowest which must be above the specified minimum value for the film.
7. Grade the roll against Optical Density specification The metal adhesion between the metal coating and the metal bonding layer reported herein was determined as follows:
1. Average the initial measurements of optical density for each sub-sample above to obtain a base level (A) for the metal adhesion test.
2. Apply Scotch Premium Grade 610 adhesive tape to the metallized film in the machine direction between the two lines marked as above, for approximately 30-40 cm in length, smoothing down using finger pressure. Ensure that the tape has a tail, or free end that is not adhered to the metallized test sub-sample, to permit easy removal of the tape from the test sub-sample.

3. Hold the film firmly with one hand and with the other hand peel the tape away from the film at an angle of about 45° in a sharp brisk manner ensuring that the film is not torn.

4. Measure the Optical Density every 5 cm along the area where the tape was removed and record and average the results to give the tested value (B).

5. The post tape removal measurements should be done within the marked lines, but directly adjacent to the positions initially measured. These initial positions will have had a degree of damage to the metal surface as a result of the measurement process.

6. The degree of metal adhesion is then calculated by the following formula:

$$\% \text{ Metal Adhesion} = (B/A)*100$$

The lowest result from the three sub-samples is recorded as the determined adhesion figure.

While the invention has been described with respect to various specific embodiments thereof, it will be understood that it is not intended that the invention be limited to such specific embodiments. The invention is limited only as required by the following claims.

What is claimed is:

1. A metallized multi-layer film having ultra high oxygen and moisture barrier properties, said film having an optical density in excess of 2.6 and comprising a core layer, a sealant layer on one side of said core layer, a metal bonding layer on a side of the core layer opposed to said one side, said bonding layer having a thickness less than 1 micron and comprising a preponderance, by weight, of a propylene/butene-1 copolymer and being free of particulates, and a metal coating, said metal bonding layer having one surface adhered to a first surface of said core layer and an opposed surface, said opposed surface of said metal bonding layer being oxidatively treated and said metal coating adhered to said opposed surface, said sealant layer comprising an ethylene/propylene/butene-1 terpolymer, a non-migratory antiblock agent being a non-spherical synthetic silica present in the range of 1200-4000 ppm, and a non-migratory slip agent being a spherical polymethylmethacrylate in the range of 3600-6000 ppm, said film having an oxygen transmission rate of less than 15 cc/m2/day and a water transmission rate of less than 0.1 gms/m2/day.

2. The metalized film of any one of claim 1, wherein the oxidative treatment of the oxidatively treated metal bonding layer is the sole treatment of the bonding layer and is solely flame treatment.

3. The metallized film of any one of claim 1, wherein the oxidative treatment of the oxidatively treated metal bonding layer is the sole treatment of the metal bonding layer and is solely corona treatment.

4. The metallized multilayer film of claim 1, wherein said sealant layer comprises the non-migratory slip agent in about 4800 ppm and the non-migratory antiblock agent in about 3000 ppm.

5. The metallized film of claim 4, wherein said non-migratory antiblock agent is a non-spherical 4.5 micron synthetic silica, and the non-migratory slip agent is a spherical 4 micron cross-linked polymethylmethacrylate.

6. The metalized film of any one of claim 4, wherein the oxidative treatment of the oxidatively treated metal bonding layer is the sole treatment of the bonding layer and is solely flame treatment.

7. The metallized film of any one of claim 4, wherein the oxidative treatment of the oxidatively treated metal bonding layer is the sole treatment of the metal bonding layer and is solely corona treatment.

8. The metallized film of claim 1, wherein said non-migratory antiblock agent is a non-spherical 4.5 micron synthetic silica, and the non-migratory slip agent is a spherical 4 micron cross-linked polymethylmethacrylate.

9. The metalized film of any one of claim 8, wherein the oxidative treatment of the oxidatively treated metal bonding layer is the sole treatment of the bonding layer and is solely flame treatment.

10. The metallized film of any one of claim 8, wherein the oxidative treatment of the oxidatively treated metal bonding layer is the sole treatment of the metal bonding layer and is solely corona treatment.

* * * * *